United States Patent [19]

Grimm et al.

[11] 4,450,866

[45] May 29, 1984

[54] DEVICE FOR CONTROLLING A FLOWTHROUGH CROSS SECTION IN A CONTROL LINE

[75] Inventors: Gerold Grimm, Leonberg; Ulrich Kemmner, Stuttgart; Heinrich Knapp, Leonberg; Klaus Rose, Mundelsheim, all of Fed. Rep. of Germany

[73] Assignee: Robert Bosch GmbH, Stuttgart, Fed. Rep. of Germany

[21] Appl. No.: 338,410

[22] Filed: Jan. 8, 1982

[30] Foreign Application Priority Data

Jan. 10, 1981 [DE] Fed. Rep. of Germany ....... 3100514

[51] Int. Cl.³ ............................................ F16K 31/06

[52] U.S. Cl. ................................ 137/625.34; 251/129

[58] Field of Search .................... 251/129; 137/625.34

[56] References Cited

U.S. PATENT DOCUMENTS 2,750,961 6/1956 Uritis ................................ 137/625.5

3,069,846 12/1962 Buescher ......................... 251/129 X 3,570,806 3/1971 Sturman .......................... 251/129 X 3,938,778 2/1976 Hansen et al. .................. 251/129 X 4,314,585 2/1982 Nishimiya et al. ............ 251/129 X

FOREIGN PATENT DOCUMENTS 508031 12/1954 Canada ................................. 251/65

*Primary Examiner*—Arnold Rosenthal

*Attorney, Agent, or Firm*—Edwin E. Greigg

[57] ABSTRACT

A device is proposed for controlling a flowthrough cross section in a controlled line, in particular in a line carrying operating medium in internal combustion engines, in order to exert influence on the idling rpm of the engine. The device includes an actuation member comprising an immersion-coil magnet system which engages an actuation shaft with which a first valve member and a second valve member are connected. The coaxial guidance of the actuation shaft in the valve housing is effected by means of two guide diaphragms held in place relative to one another by attachment to the housing on their circumference. The valve members are identical in shape and each cooperates with a valve seat provided in a valve plate in the identical direction. The air flow may be effected via inlet apertures provided in the tubular section of the valve housing exhausting via the opened valve seats to outlet apertures in the cap.

7 Claims, 2 Drawing Figures

DEVICE FOR CONTROLLING A FLOWTHROUGH CROSS SECTION IN A CONTROL LINE

BACKGROUND OF THE INVENTION

The invention is directed to a device for controlling a flowthrough cross section in a control line including an electromagnetic actuation member and a valve for varying the cross-section. Such a device is already known but substantial friction is exerted on the movable parts, which causes undesirable errors expressed in the form of hysteresis. The electromagnet system which serves as the actuation member is furthermore quite expensive in its design.

OBJECT AND SUMMARY OF THE INVENTION

It is an object of the invention to provide a device having the advantage over the prior art of precise, friction-free guidance of the valve member.

It is another object of the invention that the hysteresis errors generated in the known devices are prevented.

It is a further object of the invention to provide both simple assembly and a compact structure for the control device.

It is still another object of the invention to provide the actuation member as an immersion-coil magnet system, which is particularly advantageous in simplicity of design and manufacture.

The invention will be better understood and further objects and advantages thereof will become more apparent from the ensuing detailed description of a preferred embodiment taken in conjunction with the drawings.

DESCRIPTION OF THE PREFERRED EMBODIMENT

In order to restrict the consumption of fuel by internal combustion engines and to reduce the proportion of toxic exhaust gas components as much as possible, it is efficacious to stabilize the idling rpm of the engine at the lowest possible level. To achieve this result, devices which control one component of the operating mixture which is burned in the combustion chambers of the engine are required. One such operating component may, for instance, be supplementary air, which flows via a bypass about a throttle valve disposed in the intake tube of the engine and is controlled by the device in question.

Figure 1:
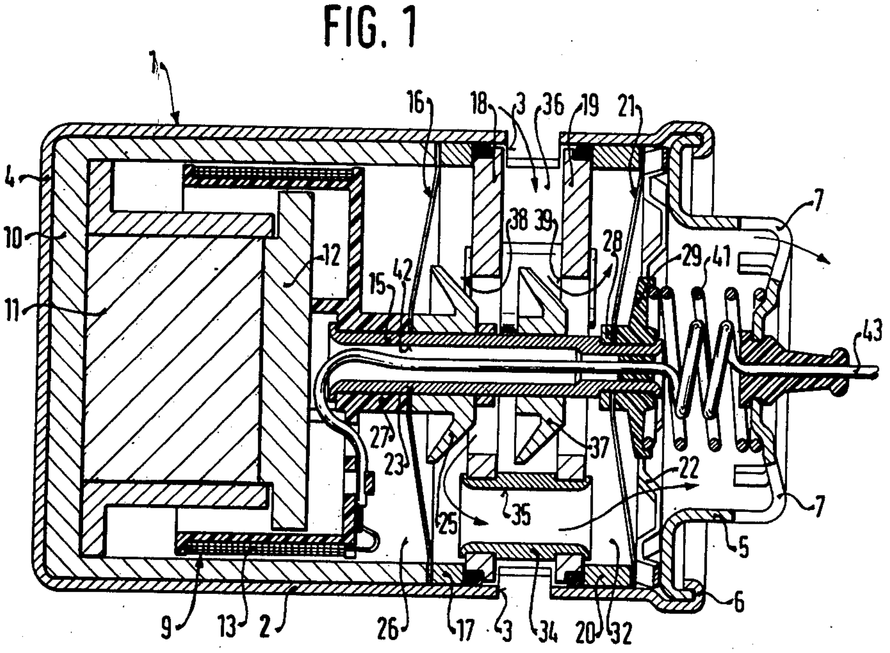
FIG. 1 shows in simplified cross sectional form, a device according to the invention for controlling a flowthrough cross section.

Referring now to FIG. 1, the device shown can thus serve, for example, to regulate the idling rpm of the internal combustion engine as discussed above. The control device includes inlet apertures 3 provided in the tubular wall section 2 of a cup-like valve housing 1. The inlet apertures 3 communicate with an intake tube section (not shown) upstream of the throttle valve of the engine. Remote from the bottom 4 of the valve housing 1, the valve housing 1 is closed off by a cap 5 which is fixed in position by a flanged rim 6 of the valve housing 1. Discharge apertures 7 may be provided in the cap 5, communicating with the intake tube section downstream of the throttle valve. An immersion-coil magnet system 9 serving as the actuation member is supported on the bottom 4 of the valve housing 1. The immersion-coil magnet system 9 has a soft-iron magnet housing 10, which is also cup-like in embodiment, a magnet core 11 having a soft-iron plate 12 on its end face, and an immersion coil 13. The immersion coil 13 is connected with one end of an actuation shaft 15 supported concentrically within the valve housing 1. Disposed in sequence in the axial direction within the valve housing, adjoining the magnet housing 10, are a first guide diaphragm 16, an intermediate ring 17, a first valve plate 18, a second valve plate 19, an intermediate ring 20, a second guide diaphragm 21, an elastic tensioning element 22 and the cap 5. The axial bracing of the listed elements is effected by the flanged rim 6 engaging the cap 5. The elastic tensioning element 22 assures sufficient bracing even in the event of changes in temperature. The guide diaphragms 16,21 extending transversely through the valve housing 1 each have a central guide bore 23, through which the actuation shaft 15 protrudes. The fixation of the first guide diaphragm 16 on the actuation shaft 15 is effected by means of a first valve member 25 pressed onto the actuation shaft 15. The first valve member 25 is disposed in a first chamber 26 between the first valve plate 18 and the immersion-coil magnet system 9 and it braces the central portion of the first guide diaphragm 16 aginst a hub 27 of the immersion coil 13. Spaced apart axially from the first guide diaphragm 16, the central portion of the second guide diaphragm 21 is connected with the actuation shaft 15 between a ring 28 placed on the actuation shaft at one side of the diaphragm 21 and a spring plate 29, likewise placed on the actuation shaft, at the opposite side.

Figure 2:
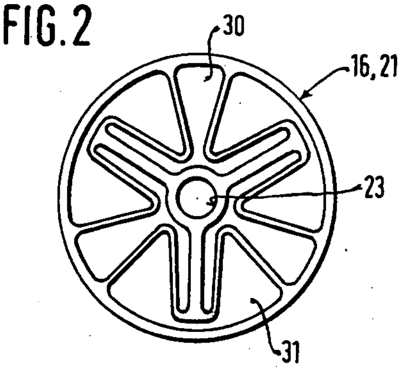
FIG. 2 shows one exemplary embodiment of a guide diaphragm for supporting the valve member of the device.

As shown more clearly in FIG. 2, the guide diaphragms 16, 21 have recesses 30, 31 which enable a flow through the guide diaphragms 16, 21 and yet cause the spring action of the guide diaphragms to be as small as possible, while providing sufficient guidance stability for supporting the actuation shaft 15. The second guide diaphragm 21 is disposed in the second chamber 32, formed between the second valve plate 19 and the cap 5. At least two connecting sleeves 34 are provided, which pass through both valve plates 18, 19; by way of the bore 35 of these connecting sleeves 34, the first chamber 26 has constant communication with the second chamber 32. The inner chamber 36 formed between valve plates 18 and 19 communicates via the inlet apertures 3 with one flow side—for example, with the intake tube section upstream of the throttle valve of the engine. A second valve member 37 is pressed onto the actuation shaft 15 inside the inner chamber 36. The valve members 25 and 37 are firmly connected with the actuation shaft 15 and are shaped identically; for instance, they may comprise truncated cones, with the smallest diameter of both valve members 25, 37 pointing in the same direction at the same time. The valve members 25, 37 taken together comprise the valve member of the device according to the invention. A first valve seat 38, with which the first valve member cooperates, is provided in the first valve plate 18, and a second valve seat 39, with which the second valve member 37 cooperates, is provided in the second valve plate 19. The valve member 37 is disposed displaceably during assembly, so that the valve members 25 and 37 come to rest simultaneously on the associated valve seats 38 and 39. A compression spring 41 acting as a restoring force is supported at one end on the spring plate 29 and on the other end on the cap 5. Thus, this spring displaces the actuation shaft 15 into a position in which the valve members 25, 37 completely open the valve seats 38, 39, so that the air flowing in via the inflow apertures 3 can flow out, obstructed to the least possible degree, via the discharge apertures 7. In the excited state of the immersion-coil magnet system 9, the actuation shaft 15 is displaced toward the right to a greater or lesser extent by the immersion coil 13, counter to the force of the compression spring 41, so that the first valve member 25 opens the first valve seat 38, or the second valve member 37 opens the second valve seat 39, to a greater or lesser extent, so that a through flow from the inner chamber 36 to the discharge apertures 7 is effected in a more or less throttled manner or is prevented completely. The actuation shaft 15 is provided with an inner bore 42, through which the electrical supply lines 43 of the immersion-coil magnet system 3 are passed.

By means of the above described embodiment of the valve member having two valve members 25, 37 disposed in the flow in corresponding fashion, an undesirable change in the flowthrough quantity is prevented from occurring in the event of pressure changes in the flowing medium downstream of the valve seats 38, 39.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A housed device for controlling a flowthrough cross section in a control line carrying operating medium in an internal combustion engine, said device further having an electromagnetic actuation member and a valve device arranged to open said flowthrough cross section to a greater or lesser extent and axially adjustable by said actuation member counter to a restoring force, characterized in that said valve device is supported coaxially within said valve housing by means of two guide diaphragms having a circumference and held in place relative to one another by attachment to said housing at said circumference, and further including two similar, coupled valve members each of said valve members arranged to cooperate with a valve seat, each valve member further including front and rear faces, wherein the front face of one valve member and the rear face of another valve member are subjected to a pressure which contacts one flow side of said valve members and the rear face of said one valve member and said front face of said other valve member is subjected to a pressure which contacts the other flow side of said valve members, said valve members being connected with an actuation shaft of an electromagnetic system which is under control of said guide diaphragms and engaged by said actuation member, said valve housing comprising a cuplike element having a bottom and said electromagnet system is disposed on said bottom of said valve housing, each of said valve seats being supported on spaced apertured plate members in said valve housing, said valve housing including a tubular wall section, said spaced apertured plate members supported in said tubular wall section and arranged to define an inner chamber, said chamber being in direct communication with said one flow side via inlet apertures in said tubular wall and said other valve member disposed in said chamber, and said valve housing further including an end cap flanged thereto, said end cap arranged to compress a tensioning means against a portion of one of said guide diaphragms and a ring member which abuts one of said spaced apertured members, means connecting said spaced apertured plate members, and another of apertured plate members arranged to abut a second ring member to which urges a portion of the other of said guide diaphragms against a magnet housing of said electromagnet system.

2. A device as defined by claim 1, characterized in that the electromagnet system comprises as an immersion-coil magnet system.

3. A device as defined by claim 1, characterized in that said means connecting said spaced apertured plate members comprise a sheath having a bore which connects chambers disposed on opposite side of said spaced apertured plate members.

4. A device as defined by claim 1, characterized in that a compression spring is disposed between said end cap and said actuation shaft.

5. A device as defined by claim 1, characterized in that said cap is provided with discharge apertures which are in communication with each of said chambers.

6. A device as defined in claim 1, characterized in that said actuation shaft has an inner bore, said bore arranged to receive electrical supply lines and electrical supply lines in said bore connected to said electromagnet system.

7. A device as defined in claim 1, characterized in that said valve members comprise conical shaped members.

* * * * *